(12) United States Patent
Bandic et al.

(10) Patent No.: US 10,275,175 B2
(45) Date of Patent: Apr. 30, 2019

(54) SYSTEM AND METHOD TO PROVIDE FILE SYSTEM FUNCTIONALITY OVER A PCIE INTERFACE

(71) Applicant: Western Digital Technologies, Inc., Irvine, CA (US)

(72) Inventors: Zvonimir Z. Bandic, San Jose, CA (US); Frank R. Chu, Milpitas, CA (US); Qingbo Wang, Irvine, CA (US); Damien Cyril Daniel Le Moal, Tokyo-To (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 14/507,572

(22) Filed: Oct. 6, 2014

(65) Prior Publication Data

US 2016/0098227 A1    Apr. 7, 2016

(51) Int. Cl.
*G06F 12/00* (2006.01)
*G06F 3/06* (2006.01)
*G06F 17/30* (2006.01)
*G06F 13/42* (2006.01)

(52) U.S. Cl.
CPC ......... *G06F 3/0643* (2013.01); *G06F 3/0611* (2013.01); *G06F 3/0685* (2013.01); *G06F 13/4221* (2013.01); *G06F 17/30218* (2013.01)

(58) Field of Classification Search
None
See application file for complete search history.

(56) References Cited

U.S. PATENT DOCUMENTS

| 8,549,518 | B1 | 10/2013 | Aron et al. | |
|---|---|---|---|---|
| 2006/0136675 | A1* | 6/2006 | Ho | G06F 3/0613 711/143 |
| 2010/0058045 | A1* | 3/2010 | Borras | G06F 9/44573 713/2 |

(Continued)

OTHER PUBLICATIONS

Cook, H. et al., "IotaFS: Exploring File System Optimizations for SSDs," 2008, pp. 1-8.

(Continued)

*Primary Examiner* — Daniel D Tsui
(74) *Attorney, Agent, or Firm* — Patterson & Sheridan, LLP; Steven Versteeg

(57) ABSTRACT

Techniques for providing file system functionality over a PCIe interface are disclosed. In some embodiments, the techniques may be realized as a method for providing file system functionality over a PCIe interface including receiving from a host device a storage command, specially devised for such a standard protocol, at a PCIe-based device controller, parsing, using at least one computer processor of the PCIe-based device controller, the storage command, traversing, using PCIe-based device controller, one or more portions of file system metadata of an associated storage media device, wherein the PCIe-based device controller is configured to traverse the one or more portions of file system metadata based on the parsed storage command independent of any subsequent communication with the host device, and returning data to the host device.

20 Claims, 8 Drawing Sheets

(56) References Cited

U.S. PATENT DOCUMENTS

| | | | |
|---|---|---|---|
| 2010/0106754 A1* | 4/2010 | Condit | G06F 12/0804 |
| | | | 707/822 |
| 2012/0096217 A1* | 4/2012 | Son | G06F 12/0246 |
| | | | 711/103 |
| 2013/0024599 A1 | 1/2013 | Huang et al. | |
| 2013/0346657 A1* | 12/2013 | Bhatta | G06F 13/385 |
| | | | 710/107 |
| 2015/0324118 A1* | 11/2015 | McCambridge | G06F 3/0613 |
| | | | 710/5 |

OTHER PUBLICATIONS

Crump, G. "Intelligent Flash Storage Demands an Innovative File System and Native Data Services," Storage Switzerland, LLC, 2011, pp. 1-2.

Halfacree, G. "Samsung releases SSD-specific F2FS file system," Accessed on Feb. 21, 2014, Published on Oct. 9, 2012, 5 pages.

Josephson, W. K. et al., "DFS: A file system for virtualized flash storage," ACM Transactions on Storage, vol. 6, Issue 3, Accessed on Feb. 21, 2014, Published on Sep. 2010, 2 pages.

Leventhal, A. H., "A File System All Its Own," ACM Queue, Accessed on Feb. 21, 2014, Published on Apr. 13, 2013, 4 pages.

Wu, X. et al., "SCMFS : A File System for Storage Class Memory," ACM, 2011, 11 pages.

\* cited by examiner

SYSTEM AND METHOD TO PROVIDE FILE SYSTEM FUNCTIONALITY OVER A PCIE INTERFACE

BACKGROUND

The Non-Volatile Memory express (NVMe) Specification is a specification for accessing solid-state devices (SSDs) and other target devices attached through a Peripheral Component Interconnect Express (PCIe) bus. The Non-Volatile Memory express (NVMe) Specification defines a register interface, a command set, and memory structures including a single set of administrative command and completion queues and many sets of operational Input/Output (I/O) command and completion queues. However, the NVMe specification provides a block device interface and thus relies on the host resources for command and control to a degree which can present a bottleneck or chokepoint in system performance.

In a system that relies on the host to parse storage commands and traverse file system metadata, the host's resource usages (especially computation power/CPU and storage/Dynamic Random-Access Memory (DRAM)) may be an impediment to overall system performance. The overall latency and throughput of the system can be bound by the capabilities of the host, especially when a new generation of storage devices exhibit tremendous performance improvement. Interface overhead during access to each layer becomes detrimental to achieving improved performance. Additionally, because the host processes storage commands and traverses file system metadata to identify the data responsive to the storage command, all file system metadata and data necessary to process the storage command has to go across the PCIe interface to the Host. There also may be a waste of data traffic when storage media is byte-addressable and metadata is handled in a block format.

In view of the foregoing, it may be understood that there may be significant problems and shortcomings associated with current technologies for providing storage access functionality over a PCIe interface. Additionally, there may be shortcomings with future byte-addressable storage technologies.

SUMMARY OF THE DISCLOSURE

Techniques for providing file system functionality over a PCIe interface are disclosed. In some embodiments, the techniques may be realized as a method for providing file system functionality over a PCIe interface including receiving from a host device a data access command at a PCIe-based device controller, parsing, using at least one computer processor of the PCIe-based device controller, the storage command, traversing, using PCIe-based device controller, one or more portions of file system metadata of an associated storage media device, wherein the PCIe-based device controller is configured to traverse the one or more portions of file system metadata based on the parsed storage command independent of any subsequent communication with the host device, and returning data to the host device.

In accordance with additional aspects of this embodiment, providing file system functionality over a PCIe interface may include implementing a device driver.

In accordance with further aspects of this embodiment, the device driver may be implemented at a level between a virtual file system interface and the associated storage media device. For example, a device driver may be implemented between a virtual file system of a Linux (or other Unix variant) and an associated storage media device.

In accordance with additional aspects of this embodiment, the device driver may present the associated storage media device as a mount point to a system on the host device.

In accordance with further aspects of this embodiment, traversing of one or more portions of file system metadata of an associated storage media device may include using file system metadata to identify a reference to a block, or a non-blocked data segment, associated with the storage command.

In accordance with additional aspects of this embodiment, a reference to a block may include a Relative Block Address (RBA), whereas a reference to a non-blocked data segment may include a Relative Byte Address (also RBA).

In accordance with further aspects of this embodiment, the associated storage media device may include a byte addressing capable storage media device.

In accordance with additional aspects of this embodiment, returning data to the host device may include returning one or more selected bytes, a block, or blocks in response to the storage command.

In accordance with further aspects of this embodiment, the byte addressing capable storage media device may include at least one of: PCM memory, MRAM, ReRAM, NOR Flash, and power-backed DRAM.

In accordance with additional aspects of this embodiment, file system functionality of the PCIe-based device controller may provide the transfer of data from a first PCIe device to a second PCIe device without requiring communication outside a PCIe network or switch connecting the first PCIe device and the second PCIe device.

In accordance with further aspects of this embodiment, the device driver may provide a block device interface.

In accordance with additional aspects of this embodiment, the device driver may provide a character device interface.

In accordance with further aspects of this embodiment, techniques may include using memory on the PCIe-based device controller as a buffer for file system metadata.

In accordance with additional aspects of this embodiment, the host device may include at least one of: an enterprise server, a database server, a workstation, and a computer.

In accordance with further aspects of this embodiment, communication between the device driver and the PCIe may be implemented using a standardized protocol.

In accordance with further aspects of this embodiment, the standardized protocol may include one or more of a specialized command set, register interface, and a memory structure to facilitate data exchange between the host and the device.

In other embodiments, the techniques may be realized as a computer program product comprised of a series of instructions executable on a computer. The computer program product may perform a process for providing file system functionality over a PCIe interface. The computer program may implement the steps of receiving from a host device a storage command at a PCIe-based device controller, parsing, using at least one computer processor of the PCIe-based device controller, the storage command, traversing, using PCIe-based device controller, one or more portions of file system metadata of an associated storage media device, wherein the PCIe-based device controller is configured to traverse the one or more portions of file system metadata based on the parsed storage command independent of any subsequent communication with the host device, and returning data to the host device.

In yet other embodiments, the techniques may be realized as a system for providing file system functionality over a PCIe interface. The system may include a storage media device and a PCIe-based device controller associated with the storage media device. The PCIe-based device controller may be configured to receive a storage command from a host device, parse the storage command, traverse one or more portions of file system metadata of the associated storage media device based on the parsed storage command independent of any subsequent communication with the host device, and return data to the host device.

In accordance with additional aspects of this embodiment, providing file system functionality over a PCIe interface may include implementing a device driver at a level between a virtual file system and the associated storage media device.

In accordance with further aspects of this embodiment, the storage media device may include a byte addressing capable storage media device.

In accordance with additional aspects of this embodiment, returning data to the host device may include returning one or more selected bytes, a block, or blocks in response to the storage command.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure relates to peer-to-peer PCIe storage transfer. Typically only a PCIe system's host CPU is capable of parsing storage commands and traversing file system metadata. The overall latency and throughput of the system may be restricted by the capabilities of the host and communication between the host and the device.

Embodiments of the present disclosure provide systems and methods which implement file system, and possibly block layer functions (e.g., in the firmware or hardware of SSD controllers), for improved performance of a locally attached I/O device. Applications can access storage devices through a mount point. A device driver, below a Virtual File System (VFS), can pass command and data back and forth between host and devices.

The controller can interpret a file system command and finish metadata traversal and data access on storage media. Data structures in host memory (e.g., shared) can be employed to provide coherence, management and accounting assistance. A communication protocol can be defined over PCIe to exchange command and data between a host and a device.

Systems and method of the embodiment delegate some host functionality to more and more powerful devices, which can better utilize next generation, byte-addressable non-volatile memory device. The scheme can reduce overhead incurred when crossing PCIe interface.

Embodiments of the disclosure reduce or eliminate involvement of a host in parsing and processing storage commands as well as traversing file system metadata over a PCIe interface.

Potential applications include improved performance storage transfers as well as peer-to-peer storage transfers. Techniques for providing file system functionality over a PCIe interface are discussed in further detail below.

Figure 1:
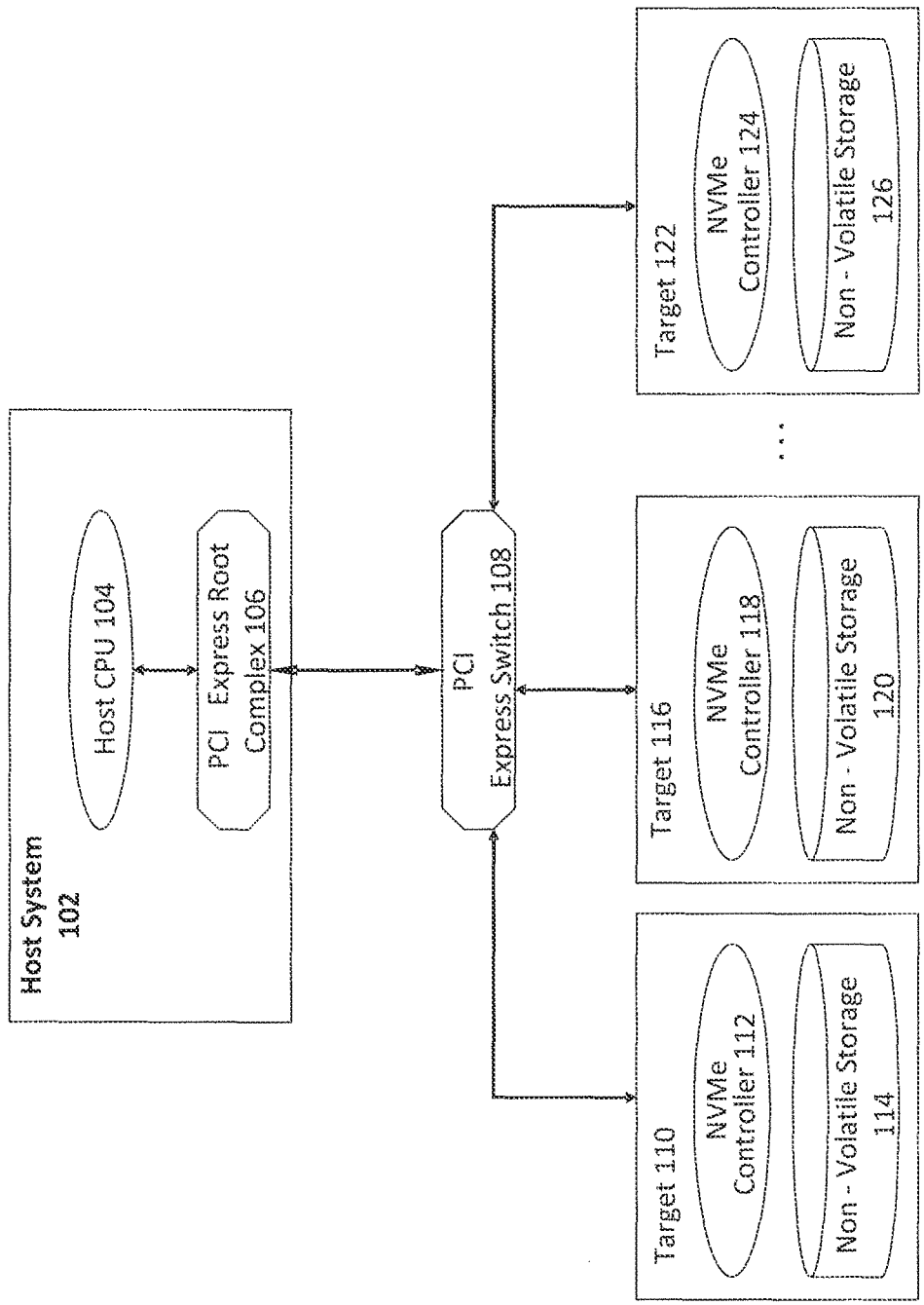
FIG. 1 shows a block diagram depicting a plurality of PCIe devices in communication with a host device, in accordance with an embodiment of the present disclosure.

Turning now to the drawings, FIG. 1 is a block diagram depicting a PCIe device in communication with a host device, in accordance with an embodiment of the present disclosure. FIG. 1 includes a number of computing technologies such as a host system 102, host CPU 104, and PCI express root complex 106. PCI express switch 108 may communicatively couple a plurality of targets (e.g., PCIe devices such as NVMe based targets) such as Targets 110, 116 and 122 to host system 102 via PCI express root complex 106.

Target 110 may contain NVMe controller 112 and non-volatile storage 114. Target 116 may contain NVMe controller 118 and non-volatile storage 120. Target 122 may contain NVMe controller 124 and non-volatile storage 126.

Memory based resources may be accessible to Host System 102 via a memory interface (e.g., double data rate type three synchronous dynamic random access memory (DDR3 SDRAM)). Memory can take any suitable form, such as, but not limited to, a solid-state memory (e.g., flash memory, or solid state device (SSD)), optical memory, and magnetic memory.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Figure 2:
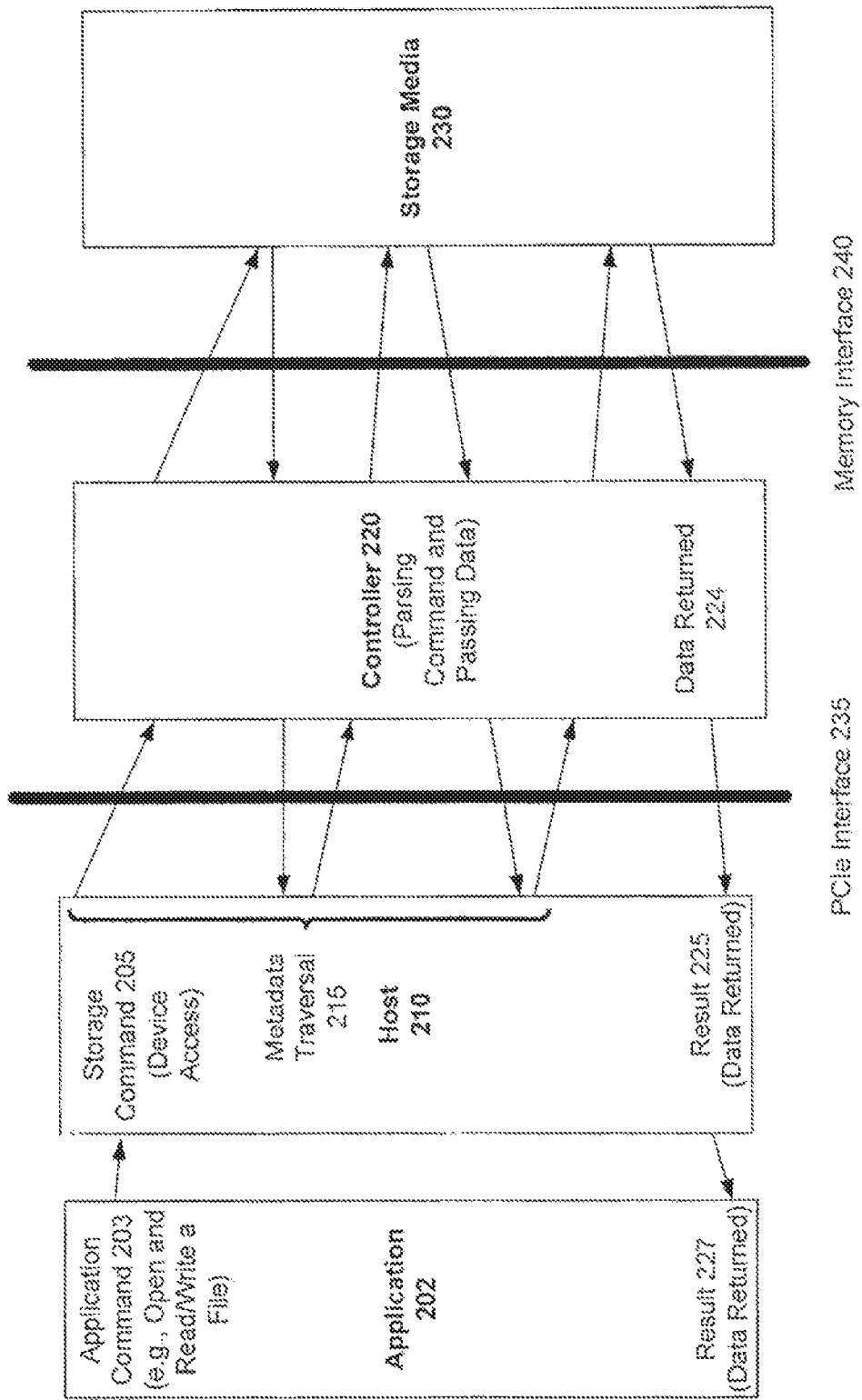
FIG. 2 depicts a block diagram illustrating file system functionality over a PCIe interface in a traditional system environment.
Figure 3:
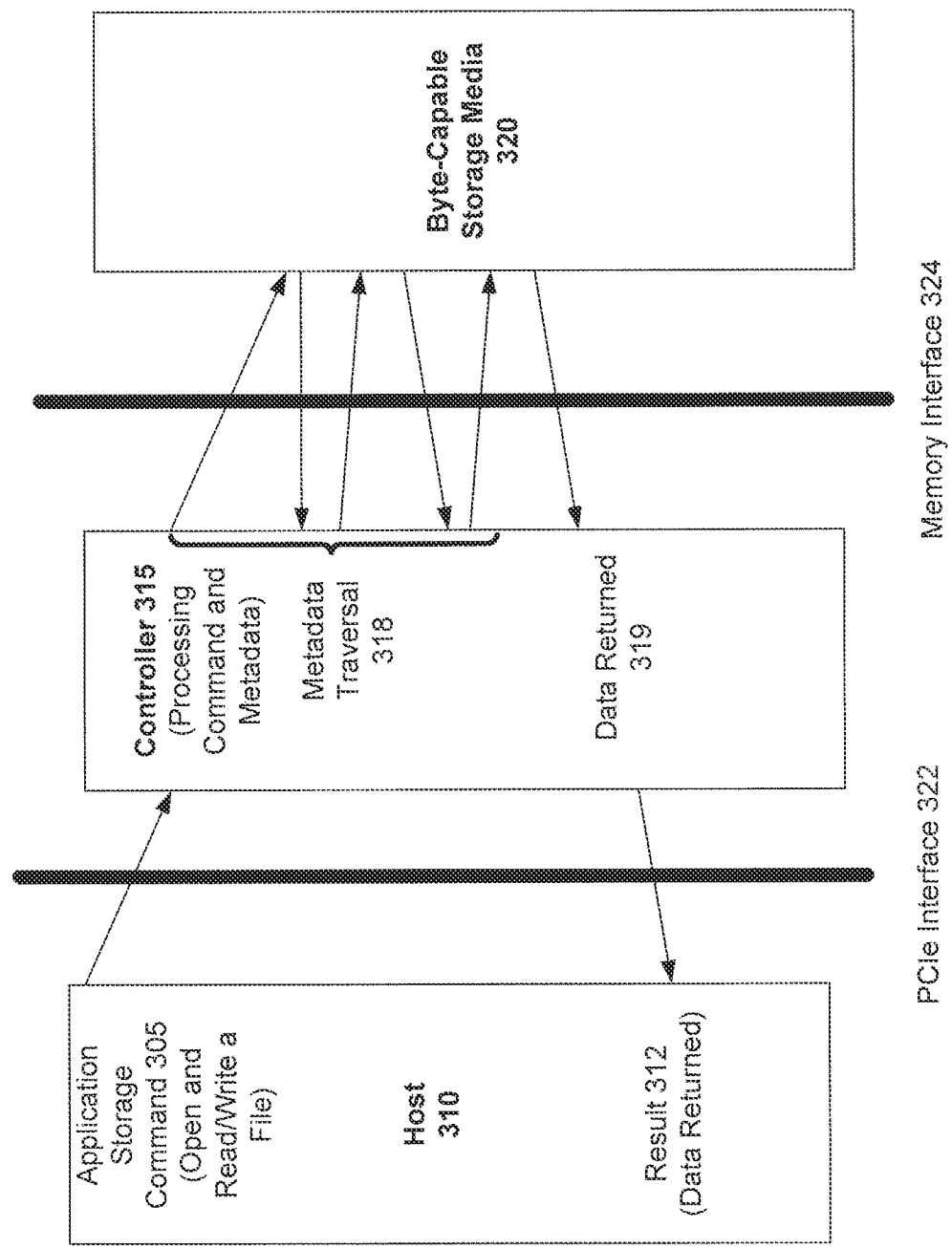
FIG. 3 depicts a block diagram illustrating file system functionality over a PCIe interface, in accordance with an embodiment of the present disclosure.

FIG. 2 depicts a block diagram illustrating traditional file system functionality over a PCIe interface. As depicted in FIG. 2, traditionally when an application 202 issues an application command 203 to storage layer 205 (e.g., tries to access files or issue open, read, and write commands), the command may be processed by Host 210. Controller 220 will parse the commands received over PCIe Interface 235 and fetch file system metadata and data from storage media 230. The file system metadata can be used by Host 210 to identify a location of data (e.g., by converting a filename or inode to an address in storage such as a relative byte address (RBA)). As illustrated, the navigation of file system metadata (e.g., metadata traversal 215) can require several passes back and forth across a PCIe interface 235 and memory interface 240 before Host 210 is able to pass a location of data to Controller 220 to have data returned (e.g., data returned 224) to Host 210 (e.g., results 225) and results 227 may be returned to an application 202. As depicted in FIG. 3, by delegating some host functionality to the device processor a portion of the load can be shifted to the PCIe device.

FIG. 3 depicts a block diagram illustrating file system functionality over a PCIe interface, in accordance with an embodiment of the present disclosure. When an application issues an application storage command (e.g., application storage command 305 to access files, open, read, and write files, etc.), application storage command 305 can be packaged and sent over the PCIe Interface 322 to the device (e.g., controller 315 and byte-capable storage media 320 of the device). The file system and other storage kernels on the devices, which can be implemented in either firmware or hardware, can parse the commands, prepare appropriate responses, and send them back via Direct Memory Access (DMA) channels. A driver may be implemented in between a Virtual File System (VFS) and a PCIe device which may handle the DMA memory management, synchronization, and other bookkeeping tasks. The driver may pass command and data back and forth between host 310 and devices (e.g., application storage command 305, data returned 319, and results 312). As illustrated in FIG. 3, the metadata traversal 318 may be only between controller 315 and byte-capable storage media 320 over memory interface 324. This may reduce traffic and latency due to traversals over PCIe interface 322. Methods and systems of the present disclosure may work well with a traditional software stack, and may not require extensive change of existing designs. Methods and systems of the present disclosure may result in less cross PCIe traffic (e.g., across PCIe Interface 322) and handshaking which may save time and reduce a processing burden on a host (e.g., host 310).

Methods and systems of the present disclosure may also allow storage device vendors to improve on-device design for improved data access performance. This may include less but more powerful data protection, adaptive coding schemes to overcome more errors, flexible data layout and format to save metadata space, and other improvements.

Methods and systems of the present disclosure may additionally facilitate peer-to-peer data exchange with less involvement of a host and reduced overhead.

Methods and systems of the present disclosure may further allow for more efficient metadata traversal when metadata is stored on byte-addressable non-volatile memory (e.g., PCM memory (phase change memory), MRAM (Magnetoresistive random-access memory), ReRAM (Resistive random-access memory), NOR Flash, and power-backed DRAM (Dynamic random-access memory)). Byte addressable memory may allow only a portion of metadata needed to be retrieved (e.g., one or more bytes) instead of an entire block. Byte addressable memory may also allow only a portion of data needed to be retrieved instead of an entire block. This can provide an improved traversal and retrieval of data.

Figure 4:
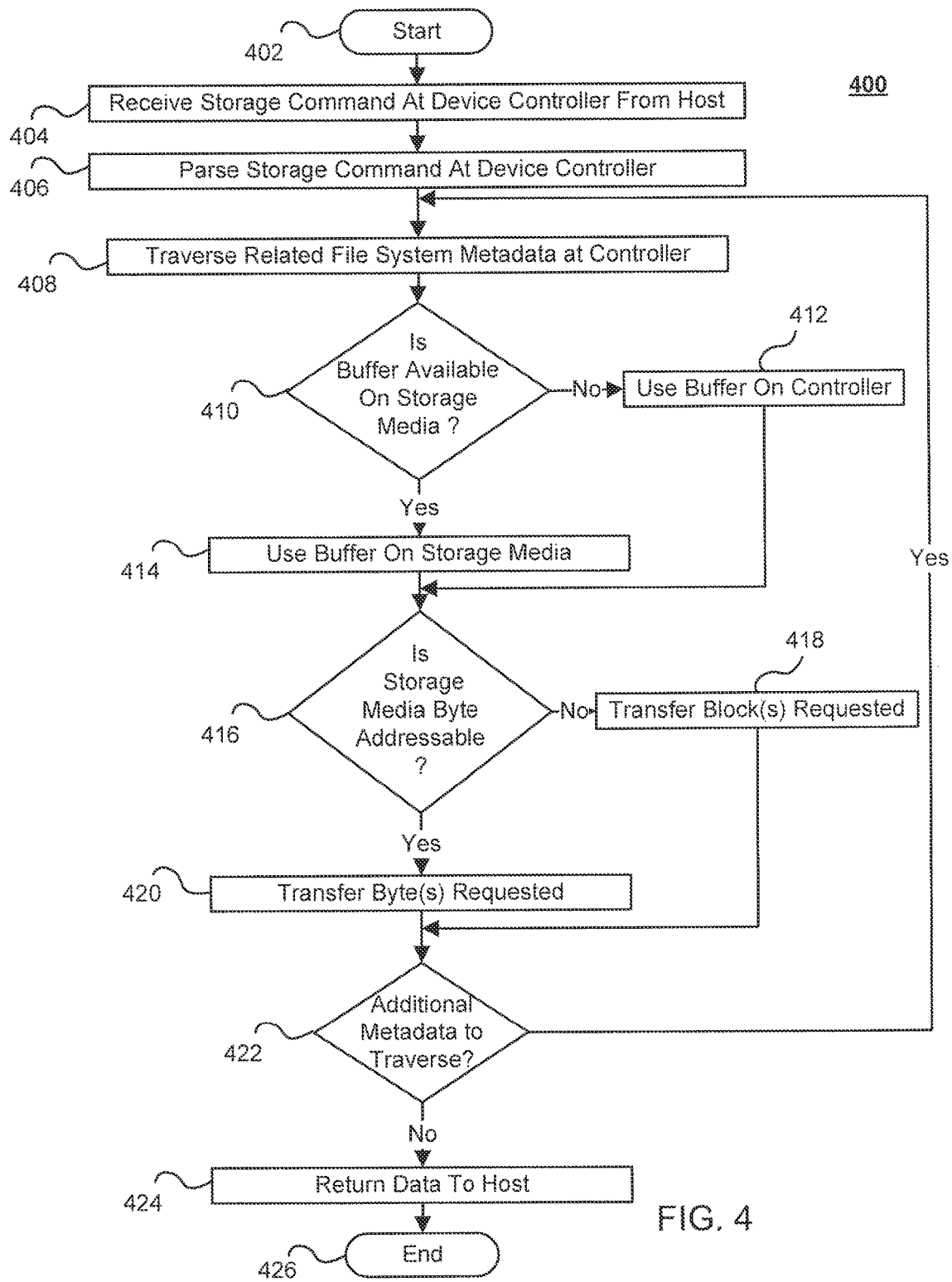
FIG. 4 depicts a flowchart illustrating providing file system functionality over a PCIe interface, in accordance with an embodiment of the present disclosure.

FIG. 4 depicts a flowchart illustrating providing file system functionality over a PCIe interface, in accordance with an embodiment of the present disclosure. The process 400, however, is exemplary only. The process 400 can be altered, e.g., by having stages added, changed, removed, or rearranged. At stage 402, the process may begin.

At stage 404, a storage command may be received at a PCIe-based device controller from a host. The storage command may be to access a file, open a file, read a file, write to a file (etc.). At stage 406, the PCIe-based device controller may parse the received storage command at the PCIe device. For example, a System on a Chip (SoC), a processor, logic gates, switches, an application specific integrated circuit (ASIC), a programmable logic controller, an embedded microcontroller or other hardware of a PCIe device may parse the storage command.

At stage 408, a PCIe device (e.g., a controller component) may traverse file system metadata related to a parsed storage command. Traversing the file system metadata may involve receiving a filename and navigating the file system to identify an address of data in storage of requested data. The file system metadata can be used by the PCIe device to identify a location of data in response to the command (e.g., by converting or traversing from a filename through a directory structure to an inode and to an address in storage such as a relative byte address (RBA)).

At stage 410, it may be determined whether memory is available as a buffer on storage media associated with the PCIe device. If space is available for use as a buffer on associated storage media, the method 400 may continue at stage 414. If space is not available for use as a buffer on associated storage media, the method 400 may continue at stage 412.

At stage 412, buffer space may be used on a PCIe device (e.g., in memory associated with the controller). This may facilitate traversal of metadata and lessen a need to go across a PCIe interface to use Host resources and buffer space.

At stage 414, buffer space may be used on storage media associated with a PCIe device. This may facilitate traversal of metadata and lessen a need to go across a PCIe interface to use Host resources and buffer space.

At stage 416, it may be determined whether associated storage media is byte addressable. If the associated storage media is byte addressable, then file system metadata and other data fetched in response to a storage command may contain only the bytes necessary to respond to the storage command at stage 420. If the associated storage media is not byte addressable, then the blocks responsive to the storage media command may be transferred at stage 418.

At stage 422, it may be determined whether there is additional file system metadata to traverse in response to a storage command. If there is additional file system metadata to traverse, the method 400 may continue at stage 408. If there is no additional file system metadata to traverse the method 400 may continue at stage 424.

At stage 424, data may be returned to the host in response to the storage command. In some embodiments, data may be returned via Direct Memory Access (DMA) channels.

At stage 426, the method 400 may end.

Figure 5:
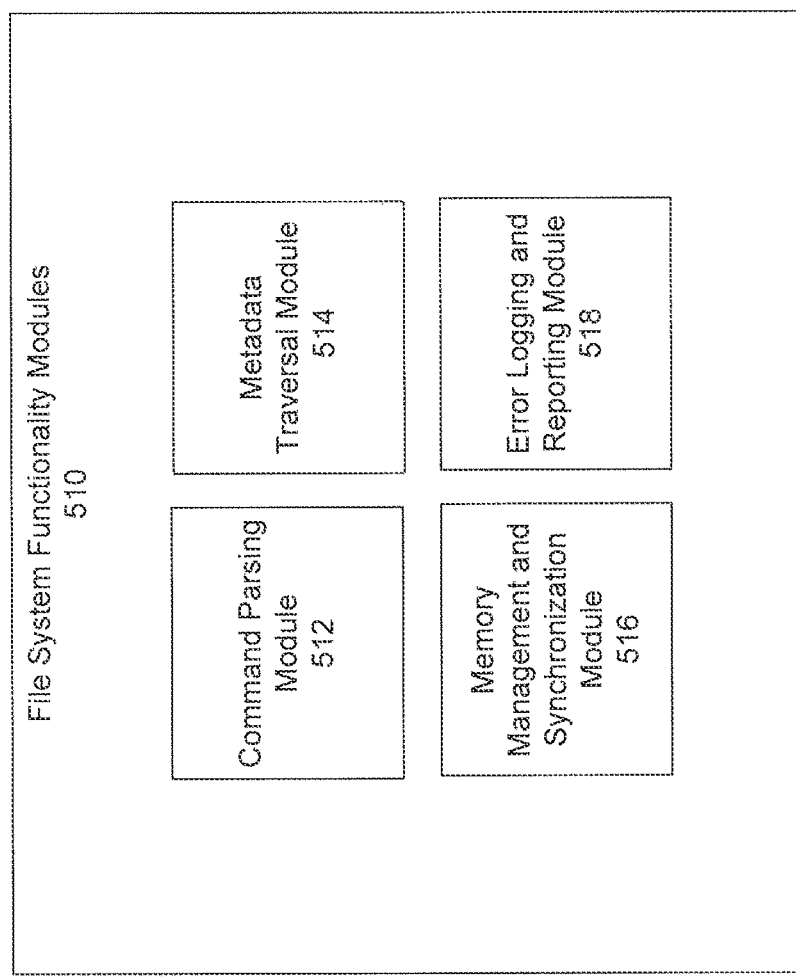
FIG. 5 depicts a module for providing file system functionality over a PCIe interface, in accordance with an embodiment of the present disclosure.

FIG. 5 depicts modules for providing file system functionality over a PCIe interface, in accordance with an embodiment of the present disclosure. As illustrated in FIG. 5, file system functionality modules 510 may contain command parsing module 512, metadata traversal module 514, memory management and synchronization module 516, and error logging and reporting module 518.

Command parsing module 512 may receive, parse, and process one or more storage commands from a host. Command parsing module 512 may reside on a PCIe device such as for example on a SoC of a PCIe device. Command parsing module 512 may work with metadata traversal module 514 to identify data in response to a storage command.

Metadata traversal module 514 may fetch file system metadata and data from associated storage media. The file system metadata can be used to identify a location of data (e.g., by converting a filename or inode to an address in storage such as a relative byte address (RBA)).

Memory management and synchronization module 516 may facilitate DMA memory management, synchronization, and other bookkeeping tasks, including authorization and authentication, etc. In some embodiments, part of memory management and synchronization module 516 may be implemented as a driver in between a Virtual File System (VFS) and a PCIe device.

Error logging and reporting module 518 may trap errors and log errors associated with implementing file system functionality over a PCIe interface. In some embodiments, error logging and reporting module 518 may provide notifications of errors. In one or more embodiments, error logging and reporting module 518 may provide fall back functionality allowing a host to resume responsibility for one or more operations (e.g., command parsing, traversal of metadata, etc.) in the event of an error.

Figure 6:
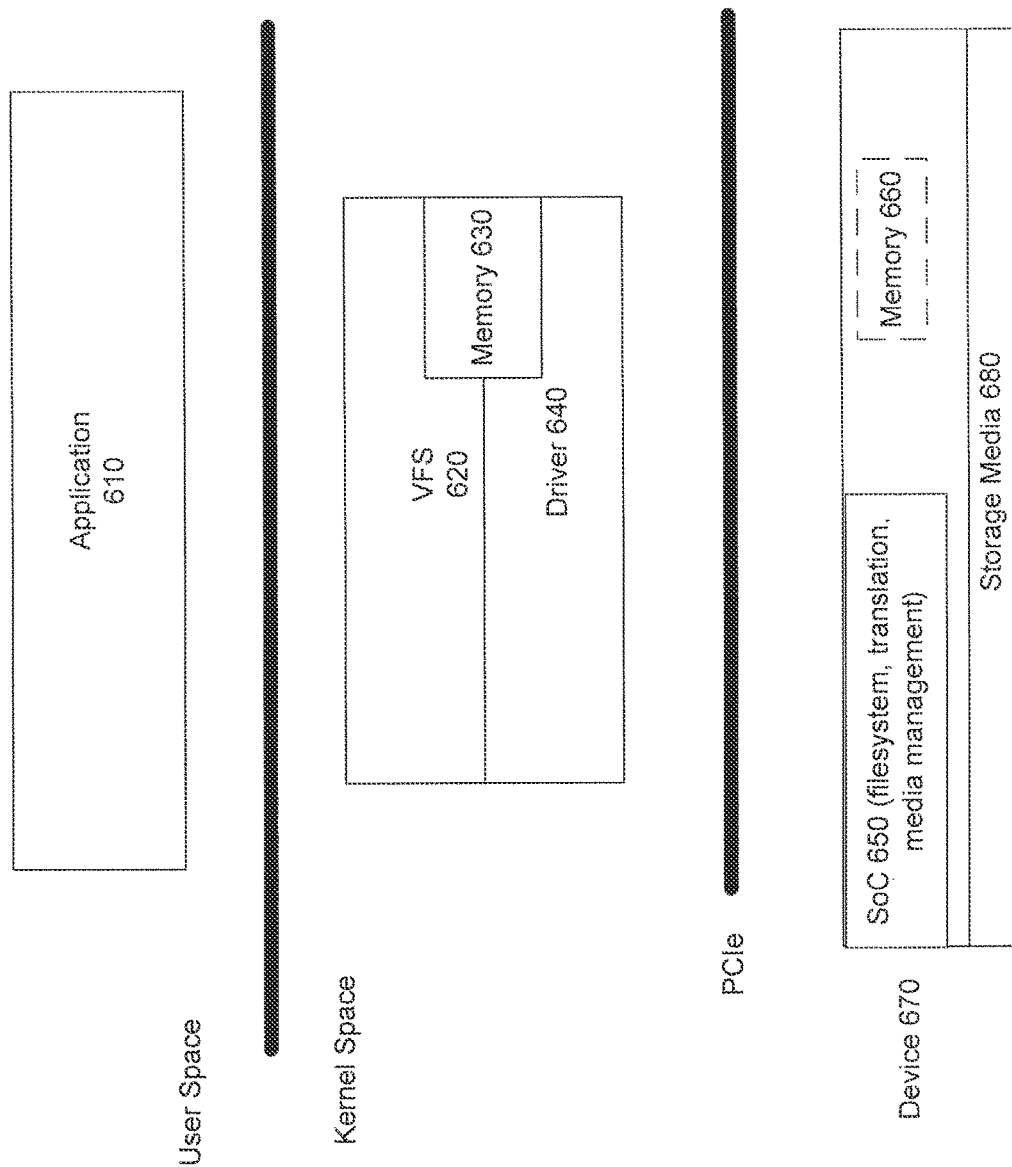
FIG. 6 illustrates a block diagram illustrating an implementation of a device driver, in accordance with an embodiment of the present disclosure.

FIG. 6 illustrates a block diagram illustrating an implementation of a device driver, in accordance with an embodiment of the present disclosure. As depicted in FIG. 6, an Application 610 may reside in user space above kernel space of an operating system. Kernel space may contain a Virtual File System (VFS) 620.

Driver 640 may be implemented between VFS 620 and device 670. Driver 640 may handle DMA memory management, synchronization, and other bookkeeping tasks. Driver 640 may pass command and data back and forth between host and devices. Memory 630 may be shared between VFS 620 and driver 640.

Device 670 may be a PCIe device and may contain SoC 650, storage media 680, and, optionally, memory 660. SoC 650 may be a System on a Chip (SoC), a processor, logic gates, switches, an application specific integrated circuit (ASIC), a programmable logic controller, an embedded microcontroller or other hardware of a PCIe device. SoC 650 may implement one or more aspects of file system functionality on a PCIe device such as, for example, file system management, translation, and media management. Storage media 680 may include one or more of PCM memory, MRAM, ReRAM, NOR Flash, and power-backed DRAM. Other byte addressing capable or block addressing capable storage may be used. In some embodiments, NAND Flash-like block storage media may be used.

Figure 7:
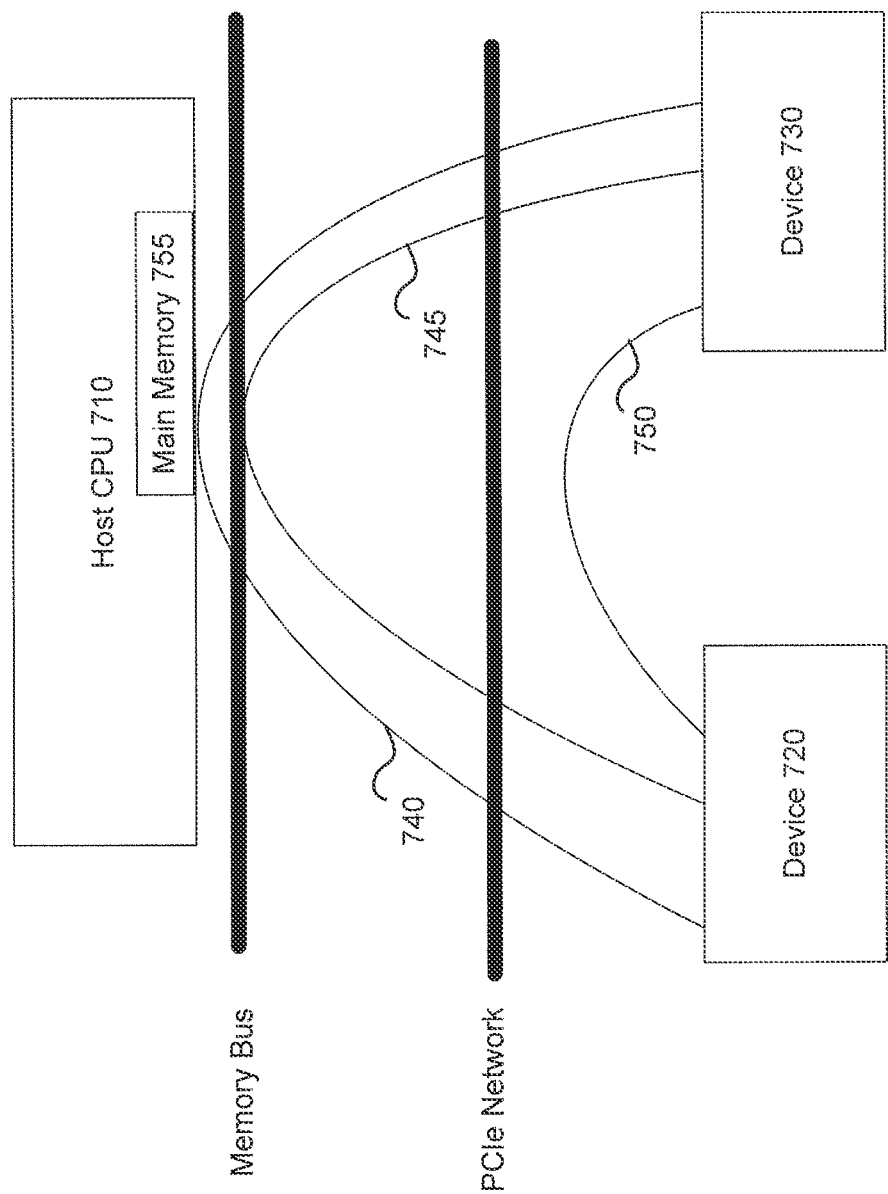
FIG. 7 depicts communication routes between PCIe devices, in accordance with an embodiment of the present disclosure.

FIG. 7 depicts communication routes between PCIe devices, in accordance with an embodiment of the present disclosure. As depicted in FIG. 7, there may be several possible routes between PCIe devices such as device 720 and device 730. Route 740 may involve communication that involves a Host CPU 710 and potential resources of a host such as main memory 755 and a shared memory bus. This may impact host performance and may increase latency as communications traverse off of a PCIe network and back. Route 745 may be independent of a Host CPU 710 may use shared resources such as a memory bus and may require communication outside of a PCIe network. Route 750 may require file system functionality such as that described in the present disclosure. However, route 750 may permit communication between devices 720 and 730 within a PCIe network without requiring Host resources.

Figure 8:
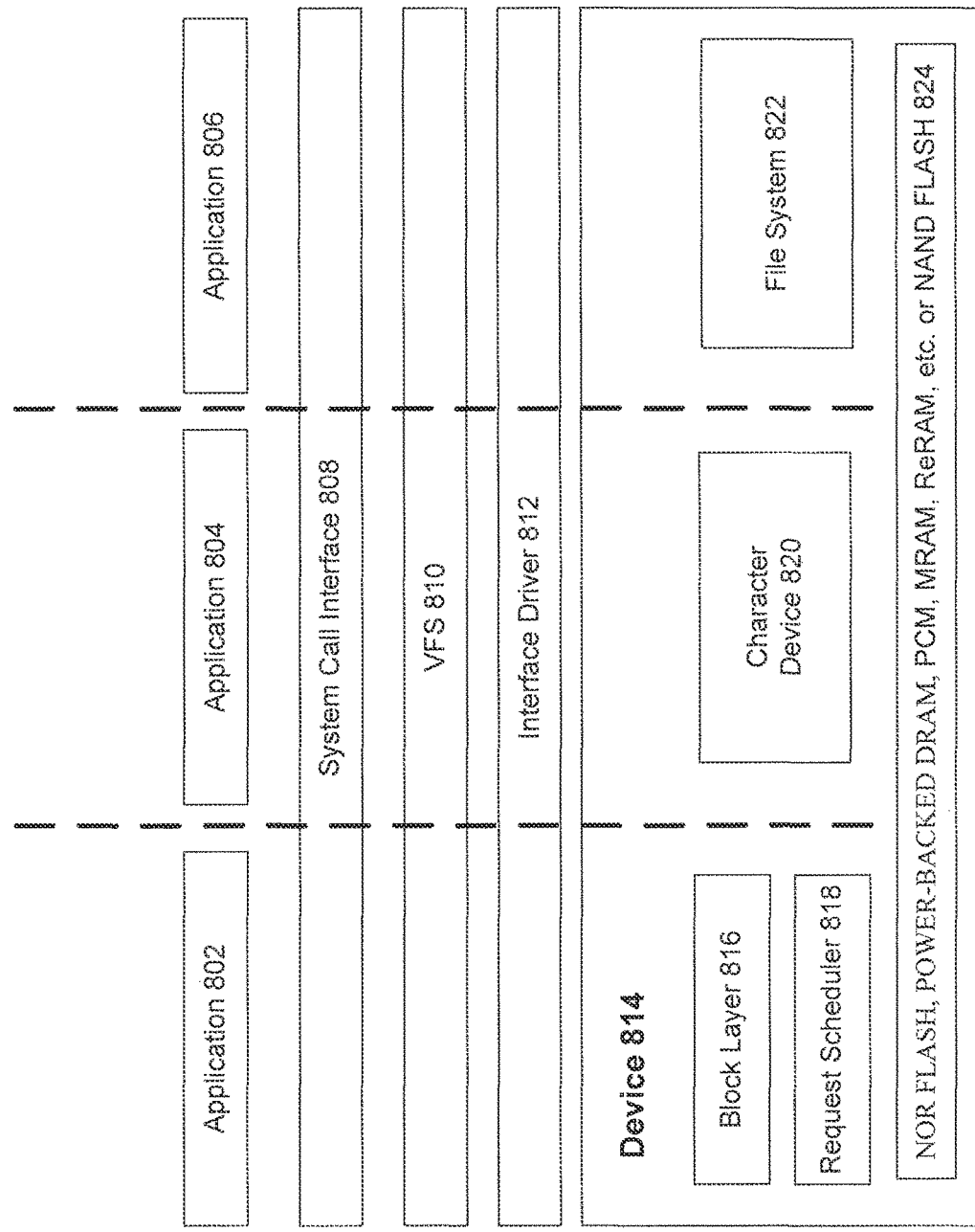
FIG. 8 depicts layers of a PCIe storage stack, in accordance with an embodiment of the present disclosure.

FIG. 8 depicts layers of a PCIe storage stack, in accordance with an embodiment of the present disclosure. As depicted in FIG. 8, applications 802, 804, and 806 may logically reside above system call interface 808. System call interface 808 may reside above Virtual File System (VFS) 810. An interface driver 812 may be provided between VFS 810 and device 814. In some embodiments, interface driver 812 may present an associated storage media device as a mount point to an application on the host device via file system 822. In some embodiments, interface driver 812 may provide a block layer interface 816 to an associated storage media device. A block layer interface may include request scheduler 818. In one or more embodiments, the device driver may provide a character device interface 820. Character device interface 820 and block layer interface 816 may provide backwards capability.

In some embodiments, device 814 may be a byte capable storage media device including byte capable storage 824. For example, the byte capable storage media device may be at least one of: PCM memory, MRAM, ReRAM, NOR Flash, and power-backed DRAM. A byte capable media device may be capable returning one or more selected bytes, a block, or blocks of data in response to the storage command. In some embodiments, NAND Flash-like block storage media may be used.

Other embodiments are within the scope and spirit of the invention. For example, the functionality described above can be implemented using software, hardware, firmware, hardwiring, or combinations of any of these. One or more computer processors operating in accordance with instructions may implement the functions associated with providing file system functionality over a PCIe interface in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for providing file system functionality over a Peripheral Component Interconnect Express (PCIe) interface, the method comprising:
    receiving, from a host device, a storage command at a PCIe-based storage device controller;
    parsing, using at least one computer processor of the PCIe-based storage device controller, the storage command independent of any subsequent communication with the host device;
    traversing, using the PCIe-based storage device controller, one or more portions of file system metadata of an associated storage device, wherein:
        the PCIe-based storage device controller is configured to traverse the one or more portions of file system metadata based on the parsed storage command independent of any subsequent communication with the host device, and
        traversing occurs without involvement from the host device; and
    returning data associated with the storage command to the host device, wherein file system functionality of the PCIe-based storage device controller provides the transfer of data from a first PCIe storage device to a second PCIe storage device without requiring communication outside a PCIe network connecting the first PCIe storage device and the second PCIe storage device.

2. The method of claim 1, wherein the providing file system functionality over a PCIe interface comprises implementing a device driver.

3. The method of claim 2, wherein the device driver is implemented at a level between a virtual file system and the associated storage device.

4. The method of claim 2, wherein the device driver presents the associated storage device as a mount point to an application on the host device.

5. The method of claim 1, wherein traversing of one or more portions of file system metadata of an associated storage device comprises using file system metadata to identify a reference to a data segment associated with the storage command.

6. The method of claim 5, wherein the reference comprises at least one of a relative block address and a relative byte address.

7. The method of claim 1, wherein the associated storage device comprises a byte addressing capable storage device.

8. The method of claim 7, wherein returning data to the host device comprises returning one or more selected bytes, a block, or blocks in response to the storage command.

9. The method of claim 7, wherein the byte addressing capable storage device comprises at least one of: phase change memory (PCM), magnetoresistive random-access memory (MRAM), resistive random-access memory (ReRAM), NOR Flash, and power-backed dynamic random-access memory (DRAM).

10. The method of claim 2, wherein the device driver provides a block driver interface.

11. The method of claim 2, wherein the device driver provides a character device interface.

12. The method of claim 1, further comprising using memory on the PCIe-based storage device controller as a buffer for file system metadata.

13. The method of claim 1, wherein the host device comprises at least one of: an enterprise server, a database server, a workstation, and a computer.

14. The method of claim 2, wherein communication between the device driver and the PCIe-based storage device controller is implemented using a standardized protocol.

15. The method of claim 14, wherein the protocol includes one or more of: a specialized command set, a format, a register interface, and a memory structure.

16. The method of claim 1, wherein the one or more portions of file system metadata are adapted to byte addressing capable storage.

17. A system for providing file system functionality over a Peripheral Component Interconnect Express (PCIe) interface, the system comprising:
    a storage device; and
    a controller configured to:
        receive a storage command from a host device;
        traverse metadata of the storage device without any involvement from the host device; and
        return data associated with the storage command to the host device.

18. The system of claim 17, wherein the controller is further configured to parse the storage command independent of any subsequent communication with the host device.

19. A system for providing file system functionality over a Peripheral Component Interconnect Express (PCIe) interface, the system comprising:
    means to traverse metadata of a first PCIe storage device without involvement from a host device; and
    means to transfer data from the first PCIe storage device to a second PCIe storage device without communication outside of a PCIe network connecting the first PCIe storage device to the second PCIe storage device.

20. The system of claim 19, further comprising means for parsing a storage command independent of any subsequent communication with the host device.

* * * * *